United States Patent [19]

Bechtolsheim

[11] Patent Number: 4,550,368
[45] Date of Patent: Oct. 29, 1985

[54] HIGH-SPEED MEMORY AND MEMORY MANAGEMENT SYSTEM

[75] Inventor: Andreas Bechtolsheim, Stanford, Calif.

[73] Assignee: Sun Microsystems, Inc., Mountain View, Calif.

[21] Appl. No.: 547,397

[22] Filed: Oct. 31, 1983

Related U.S. Application Data

[63] Continuation-in-part of Ser. No. 394,555, Jul. 2, 1982, Pat. No. 4,527,232.

[51] Int. Cl.$^4$ .......................... G06F 9/34; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,412,382 | 11/1968 | Couleur et al. | 364/200 |
| 3,723,976 | 3/1973 | Alvarez | 364/200 |
| 3,902,164 | 8/1975 | Kelley et al. | 364/200 |
| 4,037,215 | 7/1977 | Birney et al. | 364/200 |
| 4,388,685 | 6/1983 | Kotok et al. | 364/200 |
| 4,434,459 | 2/1984 | Holland et al. | 364/200 |
| 4,519,032 | 5/1985 | Mendell | 364/200 |

FOREIGN PATENT DOCUMENTS

| | | |
|---|---|---|
| 1170586 | 11/1969 | United Kingdom . |
| 1413739 | 11/1975 | United Kingdom . |
| 1547382 | 6/1979 | United Kingdom . |
| 1593312 | 1/1981 | United Kingdom . |
| 2008821 | 1/1982 | United Kingdom . |

Primary Examiner—Harvey E. Springborn
Attorney, Agent, or Firm—Blakely Sokoloff Taylor & Zafman

[57] ABSTRACT

An improved memory management system is described having particular application for use in computer systems employing virtual memory techniques. The system includes a CPU and other data processing devices, such as I/O devices, direct memory access (DMA) units, a system bus, etc., which are coupled to a "virtual" address bus for transferring virtual address information to a main memory unit (MMU). Access to the virtual bus is controlled by arbitration unit in order to insure that only a single device may communicate with the MMU at a time. In a preferred embodiment, address space within the MMU is allocated into a plurality of memory spaces, each space including translation data for use by a particular data processing device coupled to the virtual bus. A device gaining access to the virtual bus identifies the particular MMU memory space to be used for its address translation by providing unique context bits denoting the memory space to the MMU.

12 Claims, 5 Drawing Figures

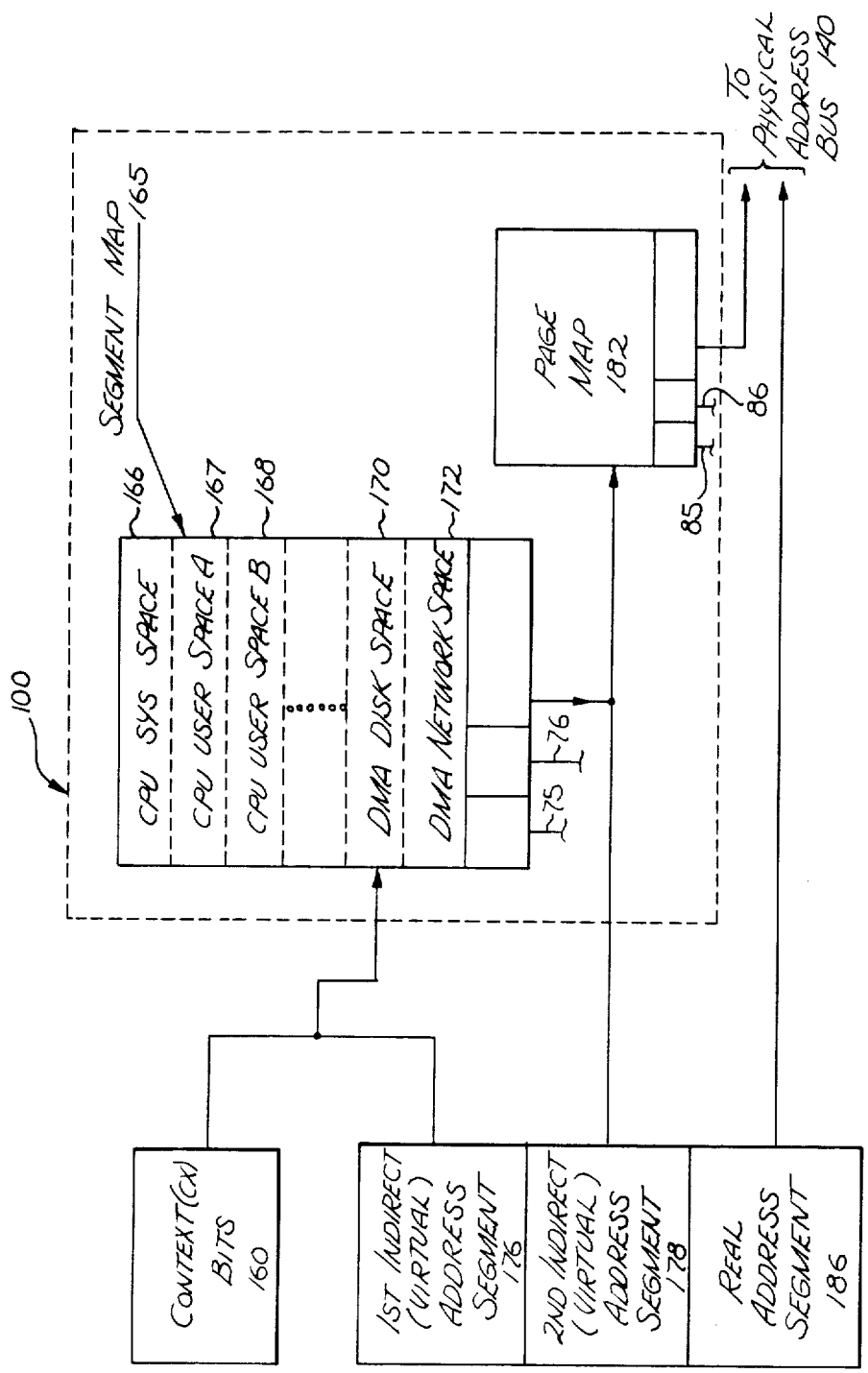

HIGH-SPEED MEMORY AND MEMORY MANAGEMENT SYSTEM

BACKGROUND OF THE INVENTION

This is a continuation-in-part of the U.S. patent application entitled "HIGH-SPEED MEMORY AND MEMORY MANAGEMENT SYSTEM" filed July 2, 1982; and assigned Ser. No. 394,555, now U.S. Pat. No. 4,527,232.

DESCRIPTION

1. Field

The invention relates to digital data processing and more specifically to the construction of memory systems for computers that involve address translation and memory management.

2. Art Background

In a typical computer system, a central processing unit (CPU) communicates directly with both an address and a data bus. These buses are coupled to a main memory (or a main memory system) as well as other devices such as input/output (I/O) ports, specialized processors, direct memory access (DMA) units, etc. The efficient utilization of the main computer memory by the CPU and other devices is critical in order to avoid undesirable time delays, data ambiguity and reduce system cost.

Memory management units (MMU's) provide capabilities such as multiple address spaces for separate processes, sharing of memory between processes, relocation of logical processor addresses into physical memory addresses, and the protection of desired memory locations by permitting only certain operations such as read, write or execute, to such areas.

In addition, memory management units often provide so-called virtual memory capabilities. Virtual memory permits a CPU to address more memory than there is physically present in main memory. This is usually done by dividing the total memory space into many small equal size units called pages. The entire memory space is stored on a secondary storage device, such as disk storage. During execution of the program only those pages are brought into main memory that are required on demand, replacing other pages that are no longer necessary. Virtual memory management schemes usually include mechanisms that assist in the page replacement operation, such as maintaining a status for each page indicating whether it had recently been used or whether it had been written into.

The principles of memory management have been known since the early history of computers and are commonplace in state-of-the-art computing equipment. However, the usage of memory management schemes normally results in a loss of performance for the computer system because each access to memory has to be translated and checked by the memory management unit, adding to the access time of memory and incurring a delay between the time the processor issues the address to be translated until the data is received from memory.

In addition, memory management systems known in the prior art typically permit only the CPU to access the MMU and translate a virtual address into a real address. Other Input/Output (I/O) devices, such as disk controllers, access the main memory using physical addresses. The use of physical addresses by these devices may cause problems since addresses from the I/O devices are not translated and checked in the same manner as virtual addresses from the CPU. As will be described, the present invention provides an improved memory management system which permits numerous data processing devices to translate unique addresses on a cycle-by-cycle basis without the necessity of reloading translation data.

SUMMARY OF THE INVENTION

An improved memory management system is described having particular application for use in computer systems employing virtual memory techniques. The system includes a CPU and other data processing devices, such as I/O devices, DMA units, a system bus, etc., which are coupled to a "virtual" address bus for transferring virtual address information to an MMU. Access to the virtual bus is controlled by arbitration unit in order to insure that only a single device may communicate with the MMU at a time. In a preferred embodiment, address space within the MMU is allocated into a plurality of memory spaces, each space including translation data for use by a particular data processing device coupled to the virtual bus. A device gaining access to the virtual bus identifies the particular MMU memory space to be used for its address translation by providing unique context bits denoting the memory space to the MMU.

The virtual address bus separates memory addresses into pre-defined real (direct) and virtual (indirect) address segments. The real (low order) address segments are coupled directly to a computer main memory array of the type having rows and columns of control lines for bit storage elements which are located at intersections of the contol lines. While the real address segments are coupled to either of the rows or columns of the main memory, the virtual (high order) address segments along with the context bits are coupled to a memory management unit which identifies which MMU space is to be used for translation based on the context bits, and then translates the virtual segments to a real physical address. The translated indirect (virtual) address segments are then coupled to the other of the rows or columns of the main memory array, such that rows and columns of the main memory array are controlled by the direct (real) address segments on the one hand and the translated indirect (originally virtual) address segments on the other hand. The rows and columns of the main memory array have connected driver circuits for enabling access to the storage elements. A timing generator is provided for strobing the row and column driver circuits with sequential pulses. While the direct real address segments arrive first at main memory and are strobed first, the translated virtual address segments arrive shortly thereafter and are strobed second, thereby permitting access to storage locations in main memory. The time between the two strobing pulses is used for virtual address translation in the MMU, and is overlapped with the access to main memory, thereby reducing main memory access time.

In addition, the invention minimizes the address translation time of the memory management unit by using high-speed static RAM (random-access-memory) for the translation process and by using the same RAM address lines both for address input and for accessing the entries of the memory management means in order to modify the translation.

BRIEF DESCRIPTION OF THE DRAWINGS

FIG. 5 is a diagramatical representation of the present invention's use of context bits to identify specific translation spaces within the MMU.

DETAILED DESCRIPTION OF THE INVENTION

An improved memory management system is described having particular application for use in computer systems employing virtual memory techniques. In the following description for purposes of explanation, specific memory sizes, bit arrangements, numbers, data rates, etc. are set forth in order to provide a thorough understanding of the present invention. However, it will be apparent to one skilled in the art that the present invention may be practiced without these specific details. In other instances, well-known circuits are shown in block diagram form in order not to obscure the present invention unnecessarily.

Figure 1:
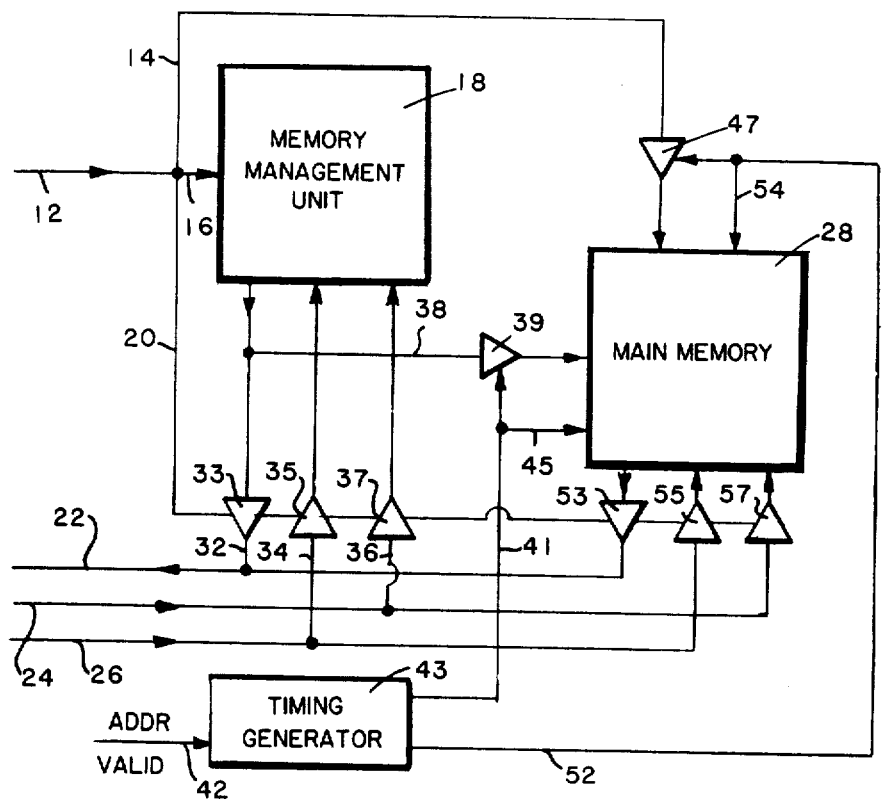
FIG. 1 is a block diagram of a high-speed computer memory in accord with the present invention.

With reference to FIG. 1, a central processing unit (CPU) not shown, communicates with the system of the present invention on an address bus 12. Bus 12 includes a plurality of individual lines which carry addresses in the form of multi-bit words. Typically, processors may use address buses between 16 and 32 bits, in which the bits are transmitted in parallel along individual lines or wires which form the address bus. In the present invention, addresses transmitted over the address bus are structured such that low-order bits form a direct (real) address segment for main memory, with the low-order bits being separated from the address bus along line 14. High-order address bits form an indirect (virtual) address segment which is taken along line 16 and coupled to a memory management means 18. For example, in the case of a 24-bit address, 11 low-order bits may form the direct real address transmitted along line 14, while 13 high-order bits are transmitted as an indirect address segment over line 16. The most significant bit may be a control bit transmitted along control line 20.

The memory management unit (MMU) 18 is a relatively high-speed random-access memory unit, such as a fast static RAM. MMU 18 takes as an input the indirect virtual address segment received along line 16, the logical virtual address supplied by the processor, and produces as an output a translated physical (real) address segment along line 38. The translated physical address segment in conjunction with the direct low order address segment on line 14 specifies the actual physical location in main memory of the desired data.

The processor includes a pair of data buses with data to the processor flowing along data bus 22 and data from the processor flowing along data bus 24. A write control line 26 also extends from the processor. The data buses 22 and 24 as well as the control line 26 are intercepted by lines which extend to the memory management unit 18 and to the main memory 28. Intercepting lines 32, 34 and 36 are respectively connected to data buses, 22, 24 and to the write control line 26. The intercepting lines are connected to drivers 33, 35 and 37, symbolized by triangles having an apex in the direction of data travel. Each of these drivers has an enabling port connected to control line 20. Line 32 serves to transfer data from the memory management unit 18 to the processor through driver 33 and data bus 22. Data from the processor is routed on line 36 through driver 37 to the MMU 18. The write control line 26 transmits a signal to the memory management unit 18 on line 34 through driver 35, allowing the MMU 18 to write data which is transmitted from the processor along line 16, which also carries the indirect virtual address segments. Data coming out of the MMU 18 along line 32 is also transmitted to main memory 28 on line 38 through driver 39. Driver 29 is enabled by the assertion of line 41 by a timing generator 43. The timing generator provides both row and column address strobes, e.g. column address strobes along line 41 and thence to line 45 and row address strobe along line 52 and then to line 54.

Main memory 28 is of the type having rows and columns of control lines for bit storage elements located at intersections of the rows and columns. The location of the storage elements is specified by addresses including the indirect virtual address segments which have been translated by memory management unit 18 into physical addresses, which are output along line 38 and driver 39 to main memory 28 for either of the rows or columns of main memory. The other of the rows or columns receives a direct real address segment on line 14 and driver 47. The same lines which communicate data to and from the processor for MMU 18 serve to communicate with main memory 28. The data buses to and from the processor, namely lines 22 and 24, are connected to main memory 28 through drivers 53 and 57. The write control line 26 is connected to main memory 28 via driver 55. The drivers 53, 55 and 57 are enabled by the control line 20 which can select between memory management unit 18 and main memory 28 for the purpose of indicating which of the two units the processor communicates with.

Figure 3:
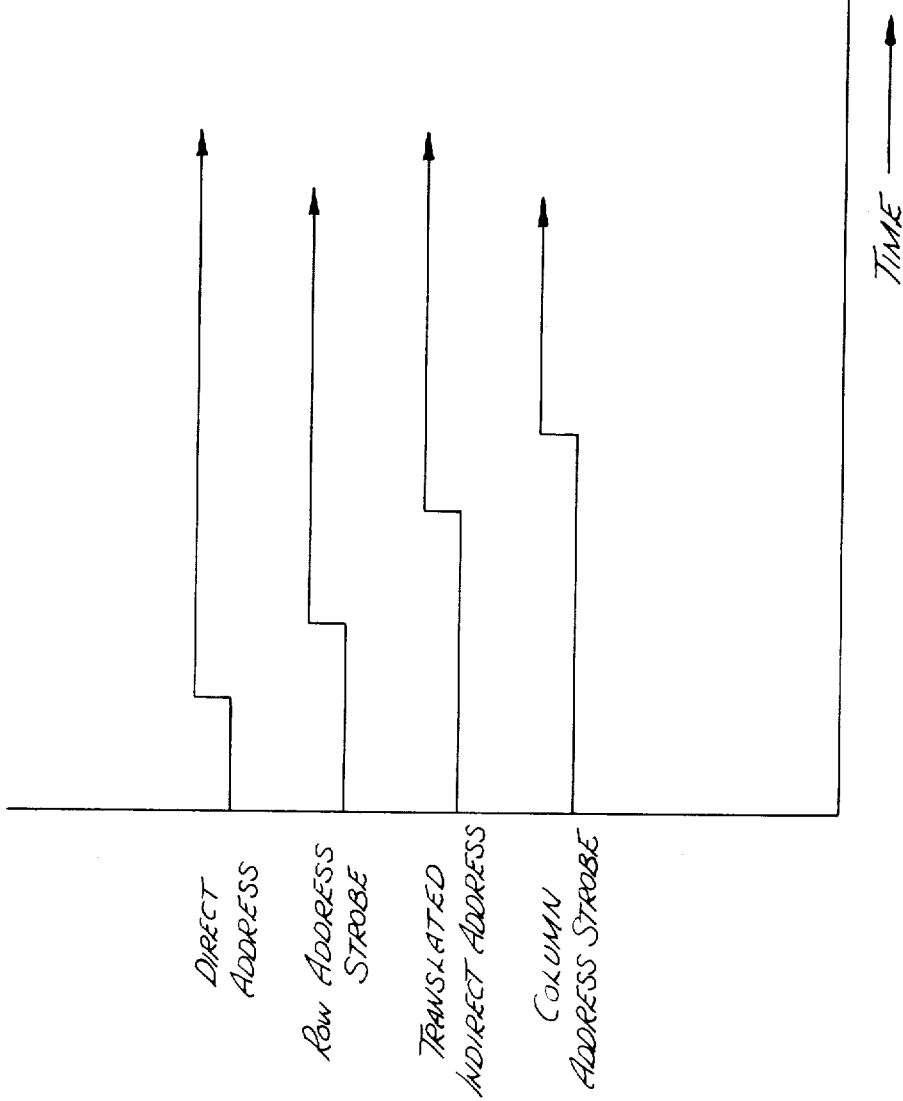
FIG. 3 is a timing diagram illustrating the arrival of direct and translated indirect address segment to the main memory in relation to row and column address strobes.

A timing generator 43 generates two sequential pulses for strobing row and column address lines of the main memory 28. The row address strobe is transmitted along line 52 to the row control lines through line 54. The same pulse enables the driver 47 such that row addresses will arrive at main memory 28 in time for the strobing pulse. The direct (real) address segments transmitted on line 14 are not translated and hence there is no delay in communicating the direct address segments from the processor. The strobing pulse for direct address segments occurs slightly prior to a second pulse transmitted along line 41. The second or delayed pulse serves to strobe translated indirect virtual address segments. The memory management means 18 translates the indirect addresses to physical addresses which arrive at main memory 28 at a time slightly later than the translated indirect memory addresses. The timing of the signals received by main memory 28 is shown in FIG. 3. For purposes of illustration, the arrival of the respective addresses and row/column strobes have been separated for purposes of clarity. In practice, it has been found that the presence of the MMU 18 introduces approximately 90 microseconds of delay before the translated virtual (now physical) address is applied to main memory 28. This time period corresponds approximately to the time delay between the application of the row and column address strobes.

The translation table stored in memory management unit 18 may be modified by writing new data into the memory management means. Control line 20 serves to enable or select access for writing and reading either MMU 18 or main memory 28 by enabling and disabling respective drivers 33, 35 and 37 on the one hand or 53, 55 and 57 on the other hand. Writing into the memory management unit 18 is accomplished using the write control line 26, the indirect virtual segment address lines 16, and control line 20. In other words, the same address lines used previously for reading the translation table in the memory management unit 18 may be used for writing a new table in the MMU 18.

In operation, an address applied to the address bus 12 is separated as previously described into direct (real) and indirect (virtual) address segments. A direct address segment, say a row address is applied on line 14 to the main memory 28, while an indirect virtual address segment, say a column address, is directed along line 16 to memory management unit 18. In MMU 18, a relatively high-speed random-access memory, the indirect virtual address segment is translated into a real physical address and transmitted along lines 38 to the main memory 28. At the main memory, sequential timing pulses from timing generator 43 arrive to strobe the row addresses and translated column addresses sequentially to row and column control lines of main memory 28 to access desired storage locations. As soon as an address along line 12 from the processor is received and a valid address is signalled to timing generator 43 along line 42, the timing generator 43 generates a row address strobe along line 52. Once the memory management unit 18 has translated the indirect address segment along and applied the new real address segment to line 38, the timing generator 43 generates a column address strobe along line 41.

Figure 2:
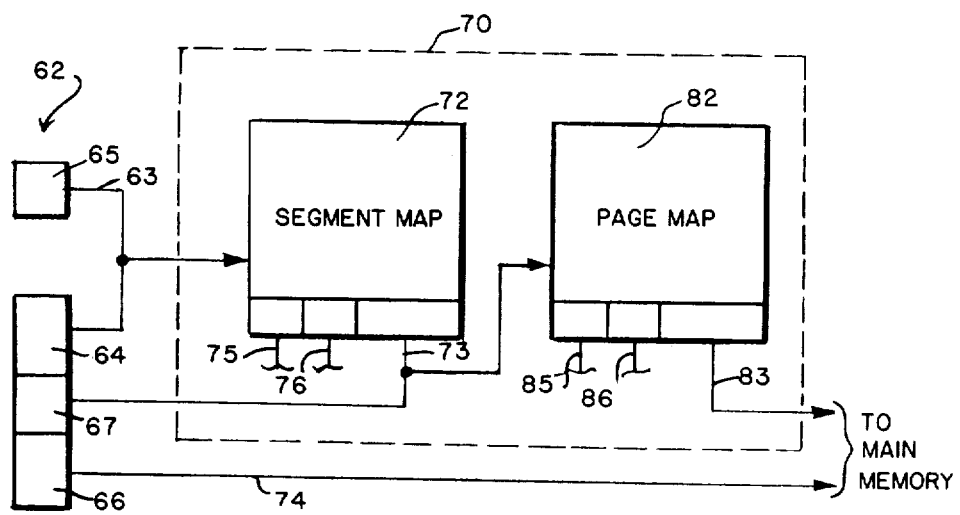
FIG. 2 is a block diagram of a specific implementation of a memory management means illustrated in FIG. 1.

As illustrated in FIG. 2, the memory management unit itself may be partitioned and two levels of indirect virtual addresses used for specifying desired locations in main memory. The left-hand column 62 is symbolic of a multi-bit logic address from a processor. The invention has previously been carried out with addresses supplied by a Motorola 68010 processor which has 24-bit address words. Not all of the address lines need be used. Four of the bits in block 65 are identified as context bits supplied by another source which serve to switch between 16 separate portions of the memory management unit indicated by the dashed lines 70. The four context bits are coupled along line 63 to a segment map 72, a random-access memory which serves to convert virtual logic addresses to translated addresses taken along output line 73. The input to segment map 72 is derived from the indirect virtual address segment symbolized by block 64 which identifies which of the separate portions of segment map 72 is to be utilized. Once this identification is made the indirect virtual address segment from block 64 can be translated. A direct real address segment is symbolized by block 66 and is transmitted directly to main memory along line 74 which is connected to either the row or column control lines of main memory.

As previously mentioned, the segment map 72 converts virtual logic addresses from block 64 to addresses taken along output line 73. Additionally, coded bits of data may be input to segment map 72 on line 75 for memory protection. For example, a read or write data indication may be given along line 75, as well as other protection codes. Other lines, such as line 76 may be provided for still further protection or control. Lines 75 and 76 would typically be controlled by the processor upon command. The address 73 generated by the segment map is transmitted to a page map 82, a random-access memory which may be the same size or different size from segment map 72. The function of the page map 18 is to receive the address transmitted along line 73 and combine it with a second indirect virtual address segment, symbolized by block 67 to generate a real physical address which is output along line 83. Thus, it may be seen that the memory management unit 70 uses two levels of indirect virtual addresses, a first level symbolized by block 64 which is transmitted to segment map 72 and a second level 67 which is transmitted to page map 82. Both levels are merely specified address bits which are separated from an address word and coupled directly to the desired memory location. Page map 82 is provided with control lines 85 and 86 which may be used for protection, similar to lines 75 and 76.

If the type of operation to be executed is protected and cannot be executed, the operation is aborted. For example, protection may call for read-only and a write operation is attempted. The protection mechanism would prevent the write operation. This is achieved by generation of an error signal which disables the write strobe from occurring, even though access to main memory has already been initiated, leaving data in the main memory 28 unchanged.

The output from page map 82 is a physical real address segment which is coupled to line 83 to either the rows or columns of main memory not connected to line 74. Together, lines 74 and 83 control rows and columns of main memory as in FIG. 1. Not shown is the timing generator which provides the row and column address strobes. Since line 74 is connected directly to main memory 28, address bits along this line arrive at main memory slightly prior to the now translated virtual address segment. The timing generator strobes the direct address segment first and the translated virtual segment second so that row and column address lines of main memory are activated for accessing specified bit storage locations in the main memory array.

One of the advantages of the present invention is that by separating addresses into direct real and indirect virtual segments, time is saved in accessing main memory 28 because main memory access begins even before the virtual memory address has been translated into a physical address by the memory management unit 18. Thus, access to main memory is time-overlapped or "pipe-lined" with the translation of the indirect virtual address segment. The direct real address segment goes directly to memory and no time is lost, while only the indirect virtual segment is translated. By simultaneously providing a high-speed memory management means, such as a fast random-access memory, translation time can be minimized such that both the direct and translated indirect address segments can be strobed into memory by timing pulses which are slightly offset from each other.

Figure 4:
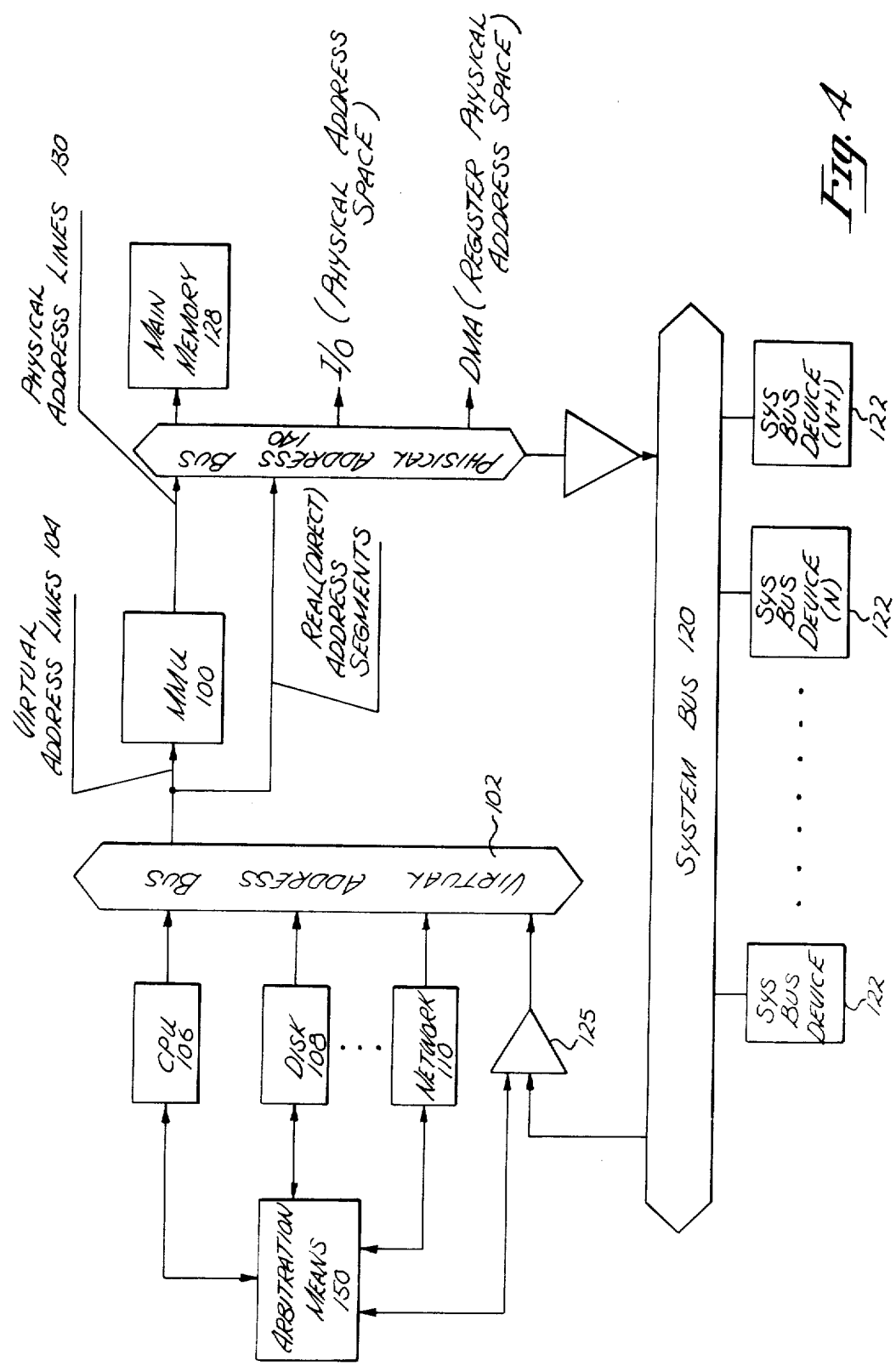
FIG. 4 is a block diagram of a high speed memory management system in accordance with the present invention.

With reference now to FIG. 4, the present invention is illustrated for use in conjunction with systems utilizing multiple data processing devices employing virtual addressing techniques. The system includes a memory management unit (MMU) 100 which is similar to that disclosed and previously described with reference to FIGS. 1 and 2. As illustrated, MMU 100 is coupled to a "virtual" address bus 102 by virtual address lines 104, which in the presently preferred embodiment, comprise a plurality of individual lines carrying addresses in the form of multi-bit words. A plurality of data processing devices, such as for example CPU 106, disk interface controller 108 and a network interface 110 may be coupled to virtual bus 102. Network interface 110 may by way of example, couple a local area network such as "Ethernet", "DECnet" or the like to the present invention. In addition, as illustrated, a system bus 120 employing "real" physical addresses for coupling a plurality (0 through N+1) of system bus devices 122 is provided, such that system bus 120 is coupled to the virtual bus 102 through system bus interface 125. As will be described, system bus 120 including all of its associated system bus devices 122 are considered by MMU 100 as a single data processing device employing a range of predetermined virtual addresses.

MMU 100 is coupled to a physical address bus 140 by physical address lines 130. A main memory 128 is coupled to MMU 100 by the physical address bus 140, such that as previously described with reference to FIGS. 1, 2 and 3, MMU 100 outputs a translated indirect address segment which has been converted from a virtual address into a real address segment to the main memory 128. Similarly, direct (real) address segments provided along the virtual address bus 102 by-pass MMU 100 and are coupled directly to the main memory 128 as previously discussed. MMU 100 is further coupled along physical address bus 140 to various data processing resources, including input/output (I/O) devices which have been allocated some physical address space generally comprising a range of physical addresses which may be accessed by the data processing devices, such CPU 106, network 110 and the like. It will be appreciated, that the system as illustrated in FIG. 4 simply represents the flow of addresses and commands between data processing devices on both the virtual as well as real portions of the system, and that other lines necessary for the operation of the system, such as data and control lines have not been illustrated for purposes of clarity.

As shown in FIG. 4, data processing devices, such as CPU 106, disk controller 108, or system bus devices 122 access main memory 128, and/or I/O address space by providing a virtual address, including both indirect and direct address segments, on virtual bus 102. Arbitration means 150 is coupled to each data processing device and interface in order to allocate access to virtual bus 102 and insure that only one data processing device may acquire and use virtual bus 102 at a time, thereby preventing ambiguity and chaos. The specific implementation of arbitration means 150 may utilize a variety of arbitration protocols known in the art in order to fairly or selectively allocate use of the virtual bus 102. System bus 120 is considered for purposes of MMU 100 operation to comprise a single device having a range of virtual address space which is suballocated to various system bus devices 122 coupled to the system bus 120.

With reference to FIG. 5, a data processing device such as disk interface 108, which desires to access for example data stored in main memory 128 provides an address including a indirect (virtual) address segment and a direct (real) address segment on virtual bus 102 after gaining access to the bus 102 through arbitration means 150. As illustrated, the address information provided by disk interface 108 (or other device) includes context bits 160 which identify unique preallocated virtual address space within segment map 165, corresponding to translational data needed to translate disk interface 108 virtual address information into a real physical address segment which may be utilized by main memory 128. As shown, segment map 165 includes preallocated space for each data processing device coupled to the virtual bus 102 including CPU system space 166, CPU user's spaces 167 and 168, as well as disk interface space 170 and network space 172. Each of these address locations within segment map 165 includes information necessary to properly translate virtual address segments 176 coupled to virtual bus 102 by the respective data processing device. A second virtual address segment 178 is, as described with reference to FIGS. 1 and 2, coupled to a page map 182 after being combined with the output of segment map 165. A real address segment 186, as shown, by-passes MMU 100 and is coupled directly to the main memory 128 or other device through the physical address bus 140.

In practice, CPU 106 is allocated both system space 166 as well as a plurality of user spaces such as 167 and 168 in order to permit operating system virtual addresses to be translated, as well as virtual addresses associated with application software. In the present embodiment, each address space, such as DMA disk interface space 170, is addressed from 0 to some predetermined range, and the space is initially identified by the content of context bits 160. It will be appreciated by one skilled in the art that the use of context bits 160 is not necessary in all instances. For example, it is possible to allocate virtual memory address space within MMU 100 such that each data processing device such as CPU 106, system bus interface 125 and the like is allocated unique virtual address locations. For example, virtual address locations within MMU 100 corresponding to disk interface 108 would include information necessary for proper translation of virtual addresses falling within a range preallocated to the disk interface. However, it has been found, that the use of context bits 160 permits more efficient utilization of data processing resources coupled to virtual bus 102, inasmuch as addresses within each space defined within the segment map 165 may be allocated in accordance with the address requirements of the particular data processing device.

It will be noted that although each data processing device, such as network interface 110, may include a context bit register such that context bits relating to the network interface 110 are applied to the virtual bus 102 for transfer to MMU 100, a single context register may also be utilized by all data processing devices coupled to the virtual bus 102. In such event, the contents of the context bits are selectively modified on a cycle-by-cycle basis in order to reflect the particular data processing devices providing a virtual address information within the MMU 100. Similarly, it will be appreciated that another implementation of the present invention may utilize only two context registers, one for system use and one for user use, wherein system space is preallocated for both the CPU 106 and all other data processing devices such as DMA disk interface 108, network interface 100 and system bus interface 125.

As in the embodiment disclosed in FIG. 2, coded bits of data may be input to segment map 165 for memory protection on lines 75 and/or 76 as required. Similarly, lines 85 and 86 may be provided to page map 182 for data protection purposes. If the type of operation to be performed is protected, various protection mechanisms known in the art may be employed to insure the security of the data.

Assume for sake of example, that a system bus device 122 coupled to the system bus 120 desires to access main memory 128 or other physical address space coupled to the physical address bus 140. The particular system bus device couples the "virtual" address (including both direct and indirect address segments) on the system bus to the system bus interface 125. Upon receipt of the virtual address from the device 122, interface 125 requests access to the virtual bus 102 from arbitration means 150. As previously stated, system bus interface 125 is viewed by both the arbitration means 150 as well as the MMU 100 as simply another single data processing device coupled to the virtual bus 102.

Once system bus interface 125 gains access to the virtual bus 102, it applies the address information provided by the system bus devices 122 to the MMU 100. Direct (real) address segments are separated and passed directly to the main memory 128 as has been described, and the virtual address segments along with the context bits 160 are passed to the MMU 100 along virtual address lines 104.

As illustrated in FIG. 5, the context bits 160 identify a unique address space within MMU 100 which contains translational data for converting system bus virtual addresses into physical addresses. In practice, the address space within segment map 165 of MMU 100 associated with the system bus 120 is sub-divided into a plurality of areas, each area containing translational data unique to each device 122. Accordingly, the address identified by the contents of context bits 160 corresponds to a sub-divided area for translating virtual addresses associated with the particular bus device 12. Once translated, the now physical address segment is applied to the physical address lines 130 and coupled to main memory 128 (or other device) along with the previously passed direct (real) address segment 186, as has been discussed.

Thus, an improved memory management system has been described having particular application for use in computer systems employing virtual memory techniques. Although MMU 100 has been illustrated and described as comprising a segment map 165 and page map 182, it will be appreciated that the present invention may be practised using a single map for translating virtual address segments into physical address segments. In addition, although the present invention has been described with reference to FIGS. 1 through 5, it will be appreciated that the Figures are for illustration only, and that the present invention may be used in numerous other virtual memory applications.

I claim:

1. A computer system employing address translation, comprising:
   a plurality of data processing devices selectively coupled to a virtual address bus for carrying memory addresses, said address bus including means for separating a memory address into direct and indirect address segments;
   arbitration means coupled to said data processing devices for selectively coupling said data processing devices to said virtual bus such that only one of said data processing devices applies a memory address to said virtual bus at a time;
   memory management means connected to receive said indirect segments of said memory address along indirect address segment input lines for translating an indirect address segment from a logic address specified by a data processing device to a physical address, said memory management means being a relatively high speed storage array having an output along physical address lines;
   a physical address bus coupled to said memory management means, said physical address bus being coupled to at least one data processing resource having a plurality of physical addresses, each of said physical addresses being defined by said direct address segment in conjunction with said translated indirect address provided on said physical address lines;
   whereby a data processing device may access said data processing resource at high speed by passing a direct address segment directly to said resource and a translated indirect address segment to said resource thereby defining a physical address location.

2. The system as defined by claim 1, wherein said memory management means includes a plurality of translational spaces, at least one space for each of said data processing devices, such that each of said indirect address segments are directed to a particular translational space containing translational data for converting said indirect address segment to said physical address.

3. The system as defined by claim 2, wherein said indirect address segment includes context bits defining the unique address of said translational space corresponding to the particular data processing device providing said indirect address segment.

4. The system as defined by claim 3, wherein one of said data processing resources includes:
   a memory array of the type having rows and columns of control lines for bit storage elements located at intersections of the row and column control lines, the location of said storage elements specified by translated indirect addresses segments and direct address segments, either of the rows and columns of control lines connected to receive the direct segment of the memory address, the other of the rows and columns connected to receive the translated indirect address on said physical address lines,
   timing means for strobing the row and column address lines of the main memory array, a strobe pulse for the direct memory address segment occuring shortly before a strobe pulse for the translated indirect memory address segment, the strobe pulses providing for use of translated indirect and direct address segments in specifying bit storage locations in the main memory array.

5. The system as defined by claim 3, wherein said unique context bits are stored in a context register coupled to said virtual bus, such that the contents of said register are updated when a different data processing device gains access to said virtual bus.

6. The system as defined by claim 5, wherein one of said data processing devices comprises a system bus interface means for coupling a system bus having a plurality of physical addresses to said memory management means along said virtual bus.

7. The system as defined by claim 6, wherein said system bus includes a plurality of system bus devices coupled to said system bus, each of said system bus devices being allocated a sub-set of the virtual addresses assigned to said system bus.

8. The system as defined by claim 5 or 7, wherein said memory management means is partitioned into a segment map means and a page map means, said segment map means connected to receive a first indirect segment for producing an intermediate address coupled to said page map, said page map means connected to receive a second indirect segment for converting the intermediate address and the second indirect segment into said physical address, said segment map means including said plurality of translational spaces identified by said context bits.

9. The system of claim 8, wherein said segment map has protection input means for providing the conditions of data access.

10. The system of claim 9, wherein said page map has protection input means for providing conditions of data access.

11. The system of claim 10, wherein said memory management means has a write enable control line means connected thereto for using the indirect segment input lines for both reading and writing data in the memory management means.

12. The system of claim 11, wherein said high speed storage array is a static random access memory and the main memory array is a dynamic random access memory.

* * * * *